UNITED STATES PATENT OFFICE.

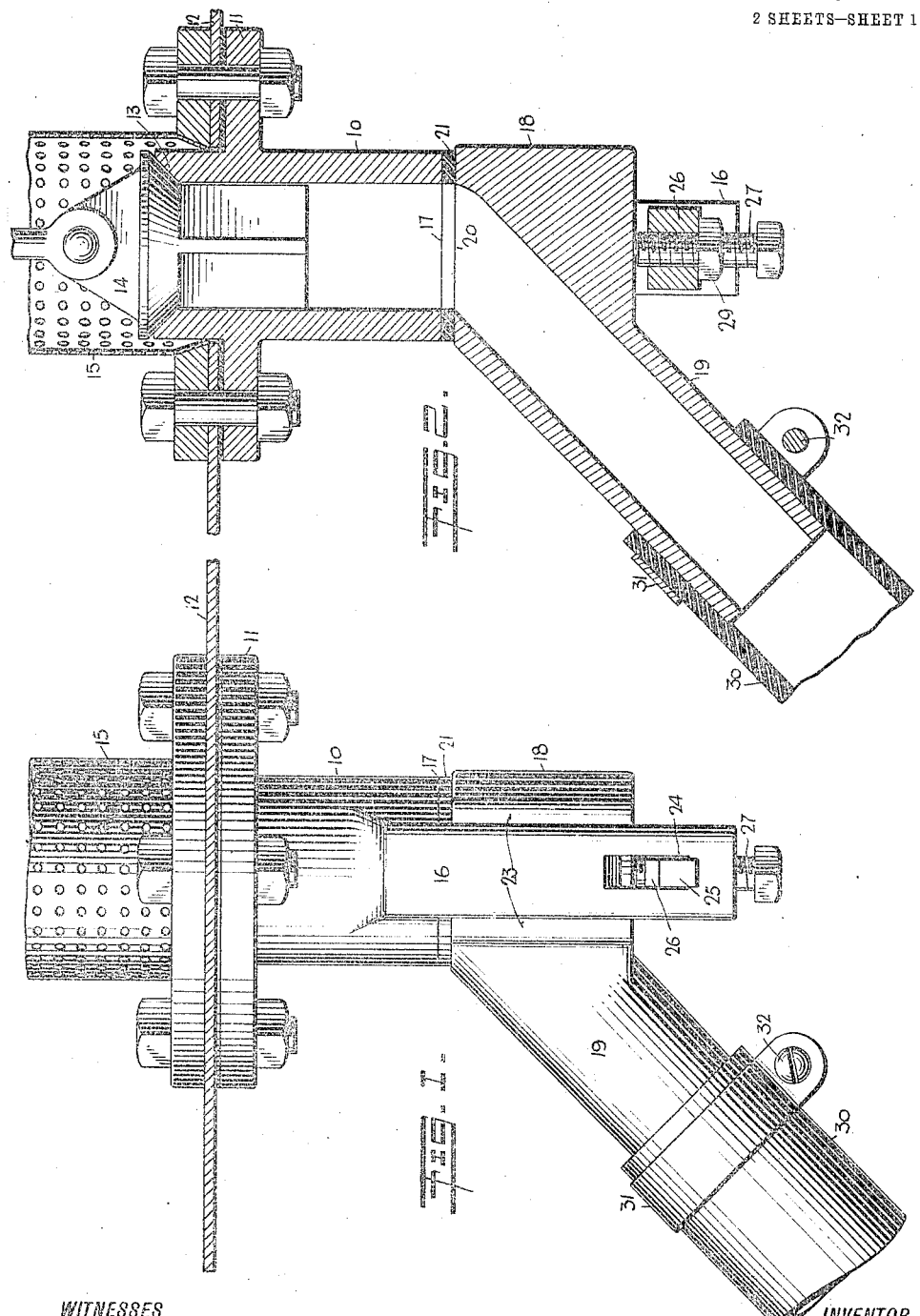

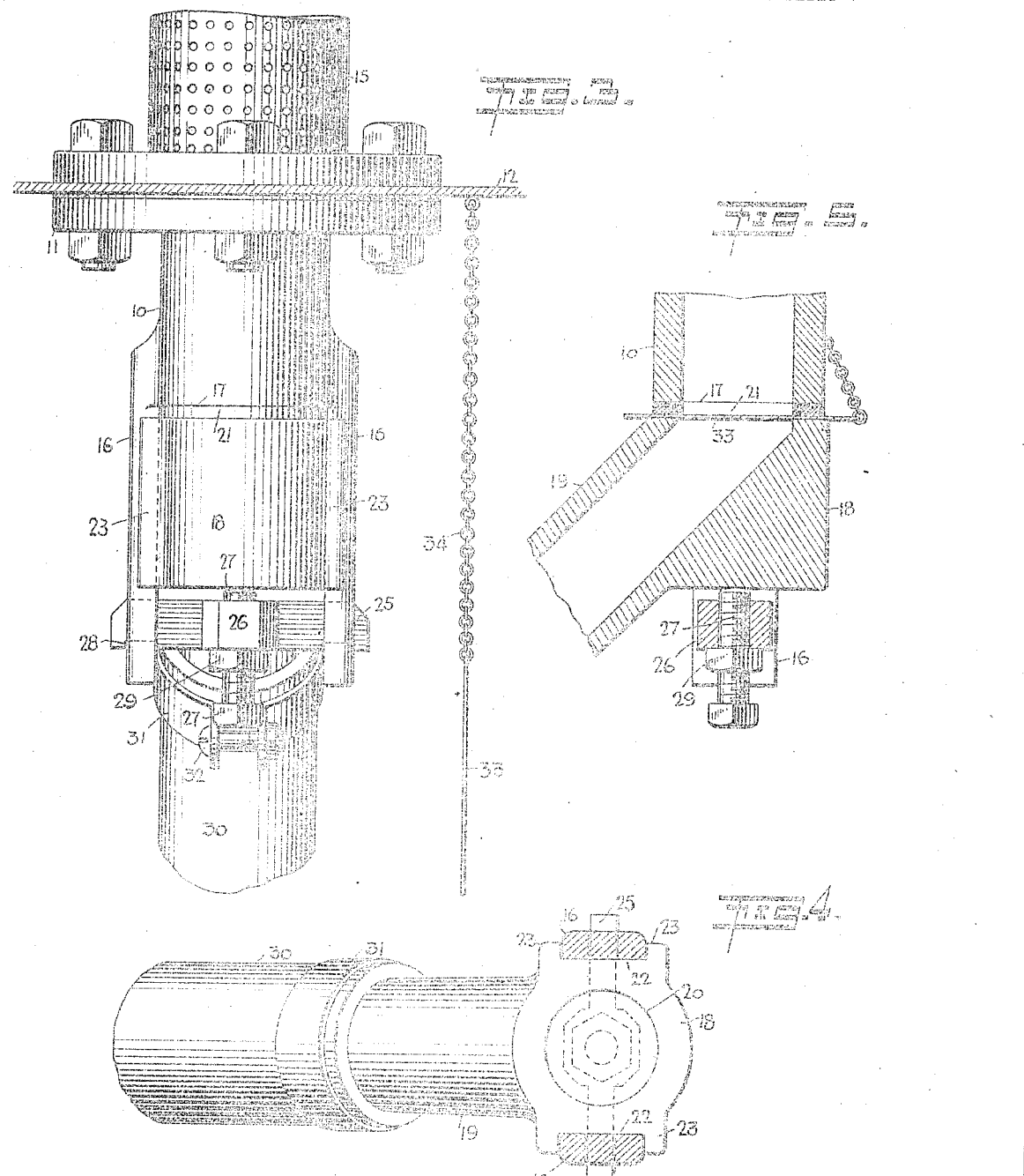

MICHAEL JAMES McGEE, OF MACON, GEORGIA, ASSIGNOR OF ONE-THIRD TO BENJAMIN FRANKLIN MERRITT, OF MACON, GEORGIA.

COMBINED LOCOMOTIVE TANK-VALVE AND GOOSENECK.

1,067,186.  Specification of Letters Patent.  Patented July 8, 1913.

Application filed January 8, 1913. Serial No. 740,263.

*To all whom it may concern:*

Be it known that I, MICHAEL J. McGEE, a citizen of the United States, and a resident of Macon, in the county of Bibb and State of Georgia, have invented a new and Improved Combined Locomotive Tank-Valve and Gooseneck, of which the following is a full, clear, and exact description.

At present, locomotive tank-valves and the gooseneck associated with the valve fitting for connection with one end of the hose leading to the feed pipe of the engine are made in various forms, but in all cases those in use include a large number of parts that not only involve expense for machining and similar operations, but materially increase the total weight. Moreover, a very serious defect in the present constructions is the impossibility of quickly connecting or disconnecting the tank-valve and hose, frequently under conditions where time is of the very highest importance; thus the tank-valve may leak, or it may be required to blow out the injector, or from any other cause a temporary disconnection and quick connection will be highly desirable.

It is an object of my invention to materially reduce the total weight of the tank-valve, goose-neck and their appurtenances; to entirely do away with a large number of parts now employed; to provide a combined tank-valve and goose-neck where no machining whatever will be required, or other finishing than the facing of the valve seat, and to provide a construction which will permit of the hose being almost instantly disconnected from the goose neck or the goose neck from the valve, and an equally quick assemblage of the parts.

The invention will be more particularly explained in the specific description hereinafter to be given.

Reference is to be had to the accompanying drawings forming a part of this specification in which similar characters of reference indicate corresponding parts in all the views.

Figure 1 is a side elevation of a combined tank-valve and goose-neck embodying my invention, and showing the same applied; Fig. 2 is a vertical section; Fig. 3 is an end view; Fig. 4 is a top plan view of the gooseneck with the adjacent end of the hose, the guide arms provided on the valve fitting being shown in section; and Fig. 5 is a fragmentary vertical section given to show an emergency cut-off provided for employment between the outlet from the valve and the inlet to the goose neck.

In constructing the illustrated practical embodiment of my invention, the valve fitting 10 is formed with the usual flange 11 adapted to be bolted in the usual manner to the tank bottom 12, and is formed with a valve seat 13 to receive the ordinary tank-valve 14, the usual strainer within the tank being indicated by the numeral 15. Depending from the tank-valve fitting 10 are two opposite side arms 16, which extend parallel with each other a substantial distance below the lower terminal or outlet 17 of the valve fitting. The depending arms 16 form guides for the head 18 of the goose neck 19, said head and goose-neck being formed integral, and the latter departing downwardly at an angle to the inlet end 20, which when the parts are assembled, as in the drawing, communicates with the outlet 17 of the valve fitting 10; there being preferably a gasket or packing ring 21 interposed between the head 18 and the valve fitting. The lower ends of the arms 16 are free and unconnected with each other, there being a free passageway for the head 18. The said head is formed at opposite sides with vertical exterior grooves 22 (Fig. 4), each groove being defined by spaced vertical ribs 23 on the sides of the head, the arrangement being such that the head 18 may be slid between the arms 16, the latter being received in the grooves 22, and being movable upwardly to a position to bring the inlet 20 of the head 18 of the goose-neck into close relation with the outlet 17 of the valve fitting. The arms 16 extend below the normal position of the head 18 and are formed at points above the lower ends thereof with vertical slots 24, the slots of the respective arms registering and being adapted to receive the arms 25 of a yoke nut 26 in which a clamp-bolt 27 takes to exert pressure against the solid under side of the head 18. Each arm 25 of the yoke nut is formed with a recess 28, to have interlocked engagement with the lower walls of the slots 24 when the clamp bolt 27 is turned into tight engagement with said head. If desired, a lock nut 29 may be provided on the bolt 27.

It will be observed that when the bolt 27 is tightened up, the goose-neck is rigidly held in place on the valve fitting 10, so that the tank-valve and the goose-neck are essentially one. Moreover, when it is desired to remove the goose-neck this can be done almost instantaneously by simply unscrewing the bolt 27 until the yoke 25—26 is sufficiently loose to disconnect the recessed portions 28 of the arms 25 from the slots 24 of the arms 16, whereupon the yoke may be shifted in the direction of its length to first disconnect one arm 25 and withdraw it from its slot 24, whereupon a tilting and reverse movement of the yoke will permit its opposite end to be disconnected and the yoke entirely removed, leaving the goose-neck head 18 free to be slid out of engagement with the arms 16. The hose 30, which in practice leads to the feed pipe of the locomotive, may be secured to the goose neck 19 by an ordinary clamp 31 having a clamp screw 32.

When it is desired to disconnect the hose 30 from the goose neck, as for instance upon the clogging of the injector, or for any other purpose, it is not necessary to disconnect the goose neck with my improved construction, but is merely necessary to loosen the clamp screw. I provide an emergency cut-off which may be employed in the event the tank-valve 14 should leak and it is desired to cut off the valve from communication with the hose. Thus a cut-off plate 33 is provided, of a size to pass between the arms 16, and between the outlet of the valve fitting 10 and the head 18 of the goose neck, as shown in Fig. 5. Ordinarily the cut-off plate 33 is suspended as by a chain 34 from the tank bottom 12 or other convenient support, and when it is desired to place the cut-off in position, a slight loosening of the bolt 27 will permit the goose neck to be lowered sufficiently for the entrance of the said cut-off, after which the tightening up of the bolt will effectively close the outlet in the valve fitting, and leave the hose 30 free to be removed from the goose neck. The described arrangement with respect to the cut-off plate also permits of an injector on one side of the engine being cut out in case it becomes inoperative, while the other injector can be operated, and a train thus brought in without waste of water.

By my improved construction it is found in practice that approximately a reduction of twenty pounds in the weight of the ordinary tank-valve, goose neck and appurtenances is effected, since the rigidity of the construction permits the lightest form to be employed and the doing away with various sleeves, nuts and other union parts at present employed. Furthermore, the complete valve fitting and goose neck are in form for use without any machining whatever, or other finishing operations than the facing of the valve seat 13. Thus there is a material reduction in cost, and the very great advantage that connections and disconnections can be made in an emergency with a minimum loss of time.

Having thus described my invention, I claim as new, and desire to secure by Letters Patent:—

1. The herein-described combined locomotive tank valve and goose neck, comprising a valve fitting having means to secure it to a tank bottom and provided with a valve seat at its upper end, an outlet at the lower end, a goose neck having an integral head fitting the lower end of the valve fitting to communicate therewith, said valve fitting having guide arms disconnected and spaced apart at their lower ends, the head of the goose neck having opposite grooves defined by spaced ribs for receiving the said guide arms, the head being receivable between the lower ends of the arms and movable on the guide arms to or from the outlet of the valve fitting, the lower ends of said arms having registering slots, a yoke nut having arms extending through the said slots and formed with recesses near the ends thereof at the under sides, and a clamp bolt taking into the said yoke nut and adapted to bear against the closed under side of the integral head of the goose neck, said goose neck extending at an angle from the integral head and being adapted to receive a hose and hose clamp.

2. The herein-described combined locomotive tank valve and goose neck, comprising a valve fitting having means for securing it to the tank bottom, and having a valve seat above said means and a depending portion forming the outlet below said means, an integral goose neck and head therefor, in communication at the upper end of the head with the outlet of the valve fitting and having an outlet at the lower end of the goose neck adapted for connection with a hose to establish communication with the feed pipe of a locomotive, and means for detachably clamping the head of the goose neck against the lower end of the valve fitting, said means comprising rigid guide arms at opposite sides of the valve fitting, corresponding guide grooves at opposite sides of the head of the goose neck, there being registering slots in the lower ends of the said guide arms below the said head, a yoke nut having oppositely extending arms projecting into the slots of the guide arms, and a clamp bolt taking into said yoke nut and adapted to bear against the under side of the head of the goose neck.

3. A combined locomotive tank valve and goose neck comprising a valve fitting having means for securing it to a tank bottom, a valve at the upper end of the fitting and an outlet at the lower end thereof, a goose neck having a head and communicating at the upper end of the head with the outlet of the valve fitting, guide arms on the valve fitting having disconnected and spaced lower ends, the said head of the goose neck having side grooves receiving the said guide arms, a yoke nut having arms in sliding engagement with said guide arms, and a bolt taking into said nut and adapted to bear against the under side of the goose neck.

4. The herein-described combined locomotive tank valve and goose neck, comprising a valve fitting adapted to be secured to a tank bottom, having a valve seat and an outlet at the lower end, a goose neck having an integral head and in communication with the outlet of the valve fitting, integral guide arms at opposite sides of the valve fitting, the head of the goose neck having grooves for receiving the said guide arms, a yoke nut slidably engaging the lower ends of the arms, a bolt taking into said nut and adapted to bear against the under side of the goose neck, and an emergency cut-off plate adapted to be received between the guide arms above the head of the goose neck and between the same and the valve fitting.

In testimony whereof I have signed my name to this specification in the presence of two subscribing witnesses.

MICHAEL JAMES McGEE.

Witnesses:
L. L. BRIGHT,
R. F. McCOWEN.